Nov. 16, 1937.   G. A. F. WINCKLER   2,099,506
ILLUMINATED BUOY FOR MARINE SERVICE
Filed May 13, 1933   3 Sheets-Sheet 1

Inventor,
Gunnar A. F. Winckler,
by Frank G. Hattie
Attorney.

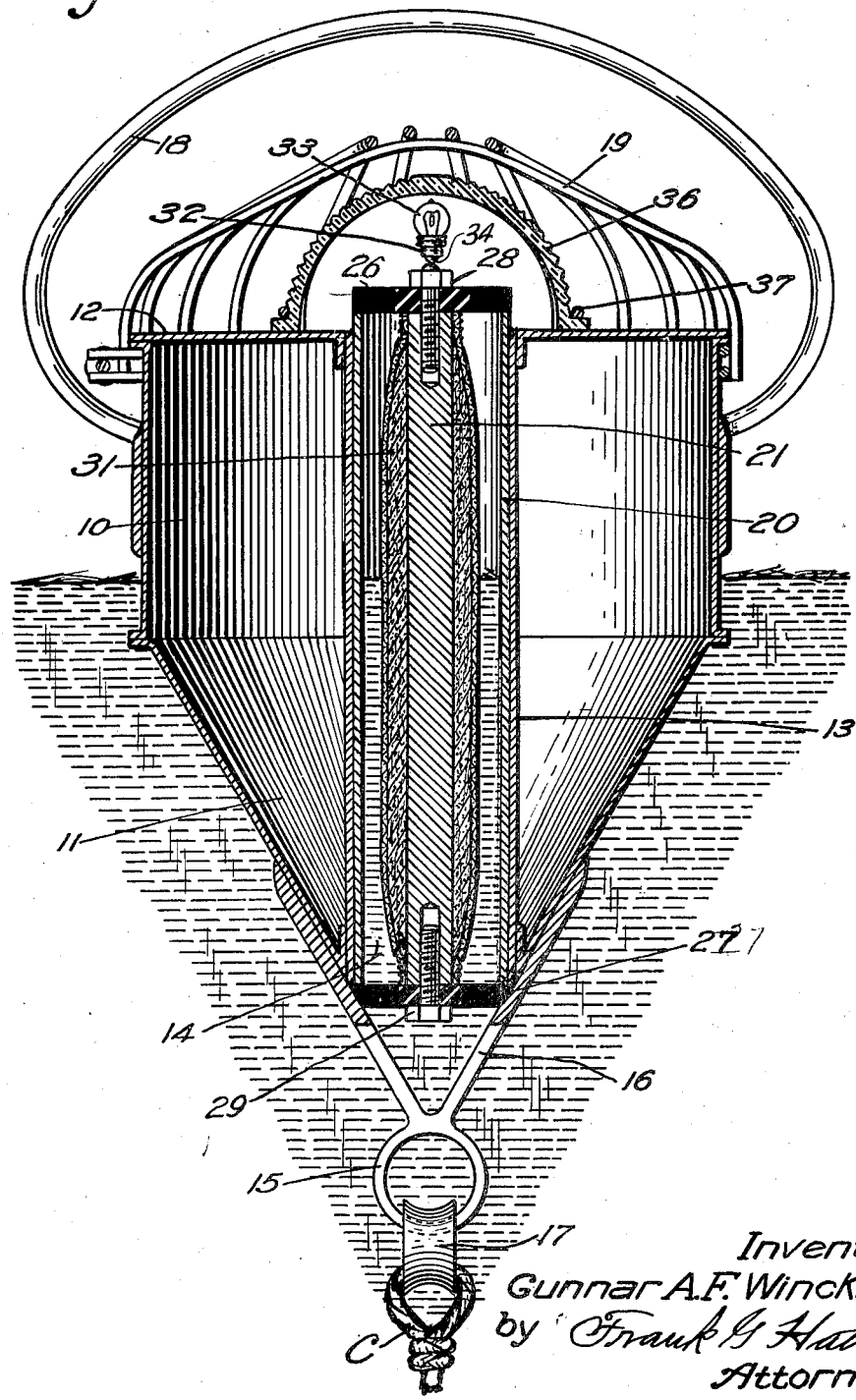

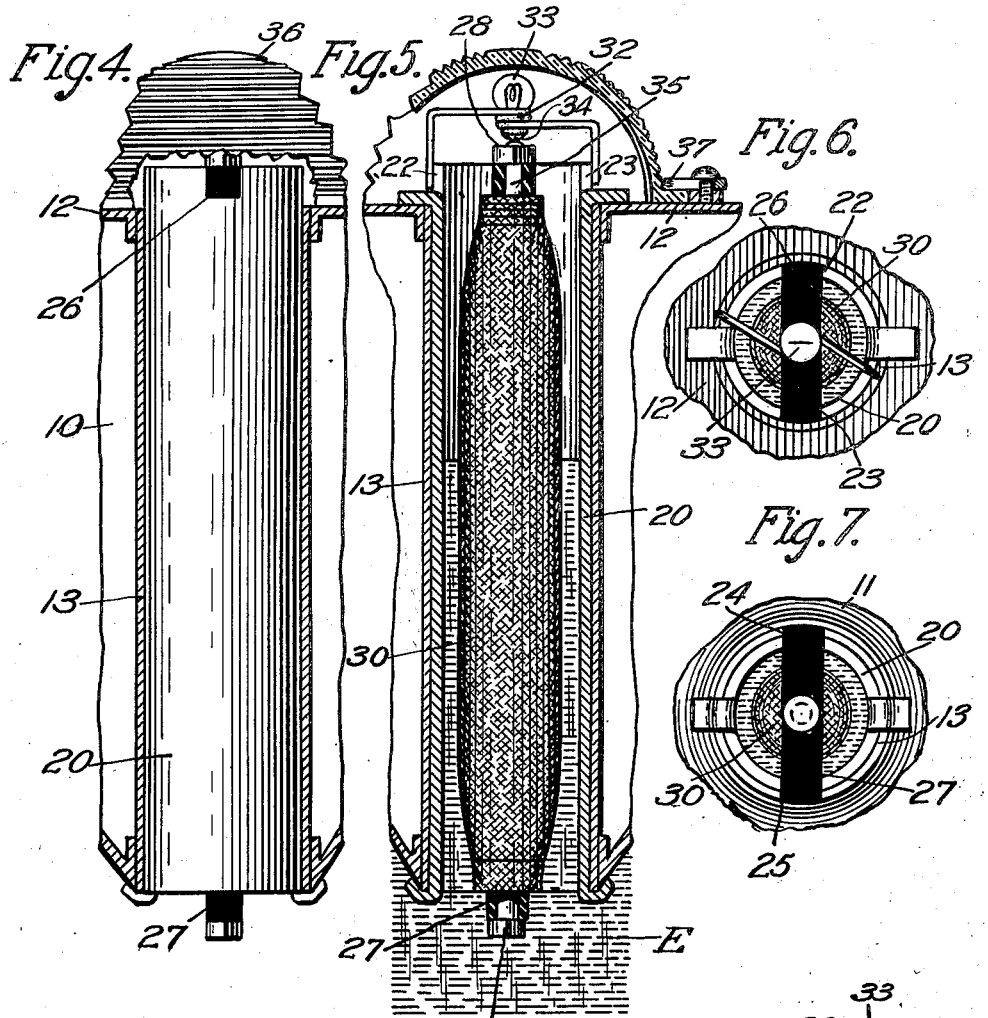

Patented Nov. 16, 1937

2,099,506

UNITED STATES PATENT OFFICE 2,099,506

ILLUMINATED BUOY FOR MARINE SERVICE

Gunnar A. F. Winckler, Worcester, Mass., assignor to Winckler Engineering Laboratories Incorporated, Boston, Mass., a corporation of Massachusetts Application May 13, 1933, Serial No. 670,903

1 Claim. (Cl. 9—83)

My invention relates to a novel sea link electrical generator for supplying electrical current to a signalling means, particularly to a lamp, which is especially adapted for illuminated buoys for marine service, used for locating objects in or on the surface of the water of the salt seas. These buoys may be of several types, such as mooring buoys, life buoys, navigation markers, and fishing buoys for marking and supporting trawls or nets.

Heretofore cumbersome expedients have been employed, such for example, as oil or gas lamps in various forms and applications. These, however, have proven uniformly unreliable and require constant attention to such an extent that proper signals are not always given, so that at times such buoys become a menace to navigation. To avoid these conditions I have devised an electrical system characterized by its simplicity and which electrical generating unit when combined with the waters of the salt seas will give constant service and a maximum length of life, and will be absolutely free from the necessity of care and attention.

My invention resides in a floating buoy having a well formed therein adapted to receive an electrical generating unit having a positive and negative electrode connected permanently with a lamp or other signalling means, which well, when immersed in the water of the salt seas, is supplied with electrolyte which both completes the electric generator and closes and energizes the electric circuit.

Under the old conditions where electrolyte is used for electrical generation, it is short lived and impractical, due to the fact that the electrolyte is rapidly contaminated in small containers and is further reduced or destroyed by evaporation. In addition, due to local action, the generator is constantly being destroyed when not in service without any useful end being accomplished and is of limited "shelf-life." To avoid this condition the waters of the salt seas are used for the electrolyte, so that an inexhaustible supply of electrolyte is available, convenient and harmless in character; and when the unit is removed from the water and is placed out of service there is neither a complete generator nor a complete circuit; therefore the local or destructive action previously referred to cannot take place, so that this unit has an infinite shelf-life and is always ready for immediate use upon immersion in the waters of the salt seas.

An object of my invention is to provide an electrically illuminated buoy, or at least a buoy having some form of electrically-energized signalling means for marine service, having an electric generator to furnish power for energizing said signalling means, and which gives unlimited service, intensive illumination or energization of any other type of electrically-actuating signalling means which may be used, and which does not deteriorate when not in use, requires no care, and is cheap to manufacture.

Referring to the figures in the accompanying drawings, in which several of my at-present-preferred forms of my invention are illustrated, solely by way of example:

Fig. 3 is an enlarged vertical section of the buoy.

Fig. 4 is a side elevation of the electrical generator as located in the buoy, the latter being broken away.

Fig. 5 is a cross section of the electrical generator mounted in the buoy, the latter being partly broken away on both sides.

Fig. 6 is a plan view of the generator.

Fig. 7 is a bottom plan view of the generator with the buoy in section.

Fig. 8 is a cross section showing the well in the buoy as well as the electric generator.

Fig. 9 is a view, partly in elevation and partly in section, showing the electrical connections.

Figure 1:
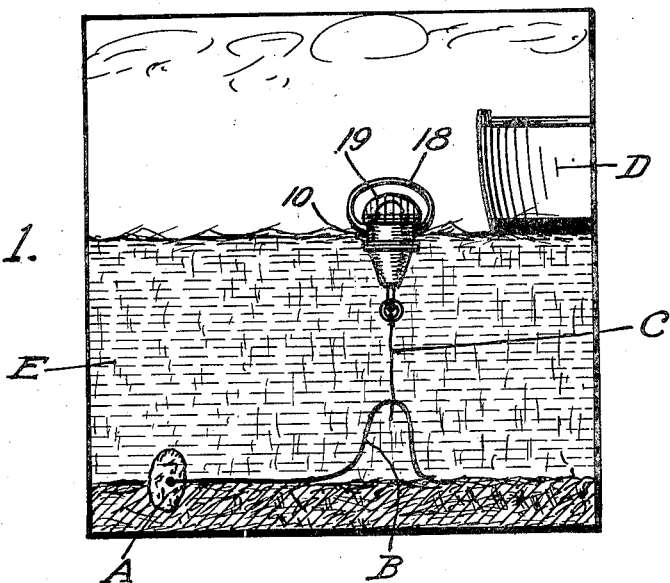
Fig. 1 is a schematic layout showing the position of the buoy in the waters of the salt seas.

Referring to the drawings, which illustrate the new buoy for marine service in this case adapted for illumination, the particular construction of Fig. 1 is adapted for locating a boat mooring indicated by the letter A, and which is anchored on the bottom of the sea. Secured to the mooring A is the mooring line B, which is connected to the mooring buoy 10 by the small rope C. Once the mooring buoy is located, the buoy 10 is lifted into the boat and the boat D can be secured in position by any mooring line B. The buoy is of the well known construction excepting the special construction necessary to secure the electrical lighting system in position.

The electrical system is dependent for its highest efficiency on the waters of the salt seas E to complete the electrical generating unit and the electrical circuit which furnishes light for the buoy.

Figure 2:
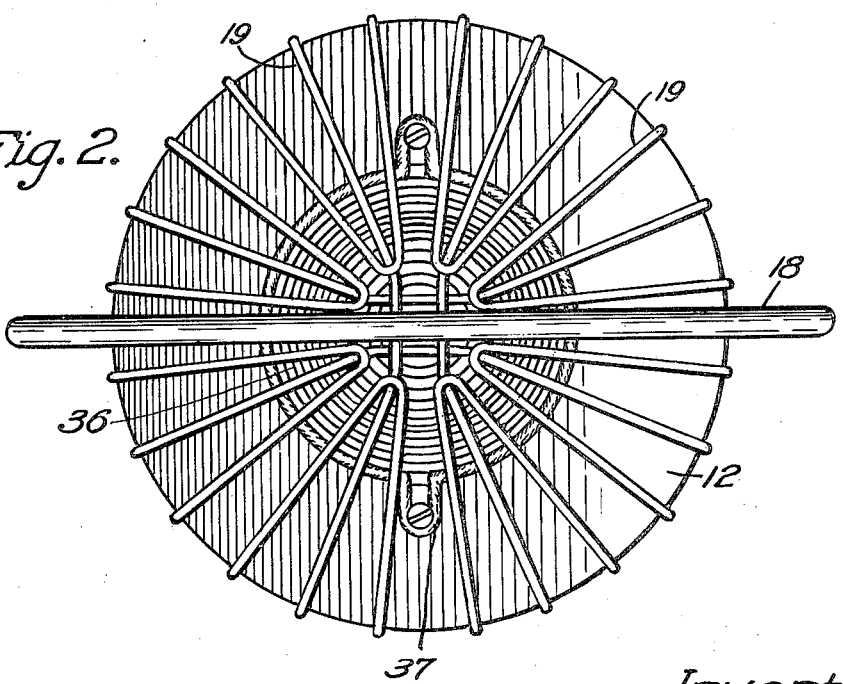
Fig. 2 is a plan view of the buoy with the lamp in position.

The buoy has a casing 10, (Fig. 2) which preferably is cylindrical in its upper section, while its lower part 11 preferably is conical, in order to obtain sufficient displacement of the water to float the buoy properly. The upper part of the buoy is shown as provided with a cover 12, mounted on the cylinder 10 of the portion 11 and shown as attached to it by suitable means such as a cylinder 13, for making an airtight buoy and for providing a chamber 14 for the insertion and operation of the electrical generator. The buoy preferably is provided with a ring 15, which I show as formed integral with the straps 16, rigidly secured to the buoy 10. I show a thimble 17 secured to the ring 15, to which the rope C may be attached. I may secure a bail 18 to the upper part of the buoy for handling purposes; and I may also secure to the upper part of the buoy a lamp guard 19, to protect the lens and the lamp from breakage.

The main embodiment of my invention may be construed as residing in providing an electrical generator for the buoy which generator is shown as located and secured in the chamber 14 which is open at both ends to allow the water to enter and also allow the air to pass out at the top when the water enters at the bottom. The generator can be secured to the buoy in any suitable manner. The generator is shown as consisting of an outer cylindrical casing 20 forming a negative electrode made preferably of zinc but which could be made of any suitable material, and an inner, positive electrode 21 which preferably is made of carbon to obtain the best generating results. I prefer to form slots 22, 23, 24 and 25 in the electrode 20, adapted to receive the insulating bars 26 and 27 for supporting the inner electrode 21 and the depending members. The bars are held in position by bolts 28 and 29 threaded into the inner electrode 21. The negative electrode 20 cooperates with the positive electrode 21, and when the casing 20 is filled with the waters of the salt seas, an electric generator is formed.

Secured to the carbon electrode 21 is shown a sack 30 consisting of a porous material such as cloth, for holding in position a layer of depolarizing mixture 31 such as manganese dioxide or copper dioxide and carbon. The mixture or material is placed in the sack, which is secured at both ends to the central carbon electrode, thereby attaching it securely in position and preventing the waters of the salt seas from wasting it away.

Secured to the cover 12 of the buoy 10 is a lamp socket 32 shown as formed of convolutions of wire the ends of which are bent downward and secured in position, forming a support for the lamp 33. The lamp-supporting structure 32 is in contact with the outer electrode 20, and the lamp base 34 and the insulated conductor 35 connect the other side of the lamp filament with the inner electrode 21, thus forming a permanently connected lamp circuit with the exception of salt sea water.

The supporting structure is an air-tight container and can be of any buoyant material having a well or hole in which or by virtue of which the new and novel electrical generator is mounted for immediate use or service. A great advantage of the structure is that when it is not in use it is completely inactive until placed in the salt sea water. To diffuse the light from the lamp 33 a lens 36 preferably is provided to increase the area of illumination. The lens is shown as held in position by suitable means such as a clamp 37 and secured in position by fastening devices, for example, screws.

In operation the mooring buoy floats in the waters of the salt seas and is attached to a mooring or any other submerged structure so that it can be located and identified when necessary, in order to secure the boat or other apparatus in position. When the buoy is thrown into the waters of the salt seas it is, by virtue of its presence there, supplied with an electrolyte which is prevented from contamination by its inexhaustible supply, together with the constant motion of the sea waves and tides; the electrolyte completing an operable generating cell for supplying current to the lamp 33.

It is obvious that once the broad features of my invention are disclosed, many modifications and adaptations will readily occur to those skilled in the art, all falling within the ambit of my contribution to the art. Accordingly, I intend that my invention be limited only by the scope of the appended claim.

What I claim as new and desire to secure by Letters Patent of the United States is:

A buoy for marine service comprising in combination an outer casing, a hollow conical end portion at the bottom of said outer casing with its apex extending downwardly, a cylindrical wall within said outer casing and concentric therewith, whereby a cylindrical chamber is formed about the vertical axis of said buoy, said chamber having insulated bars across its lower end, a sea water generator link unit located in said chamber and dimensioned to fit snugly therein, said generator unit being comprised of negative and positive electrodes, normally inoperable, nut and bolt means associated with said insulated bars for retaining said generator in place, a lamp permanently secured to the top of said generator unit and connected to the respective electrodes of said generator unit, a lens on said buoy extending over said lamp, immersion of said buoy in sea water causing the influx of water in the said chamber around the bars at the bottom of said chamber, whereby said water serves as an electrolytic link to activate said generator and energize said lamp, withdrawal of said buoy from the water causing the egress of water from said chamber and consequent cessation of the action of said generator unit and deenergization of the lamp.

GUNNAR A. F. WINCKLER.